June 16, 1953  A. DROHOMER  2,641,893
CLIPPER ATTACHMENT FOR LAWN MOWERS
Filed Aug. 18, 1951
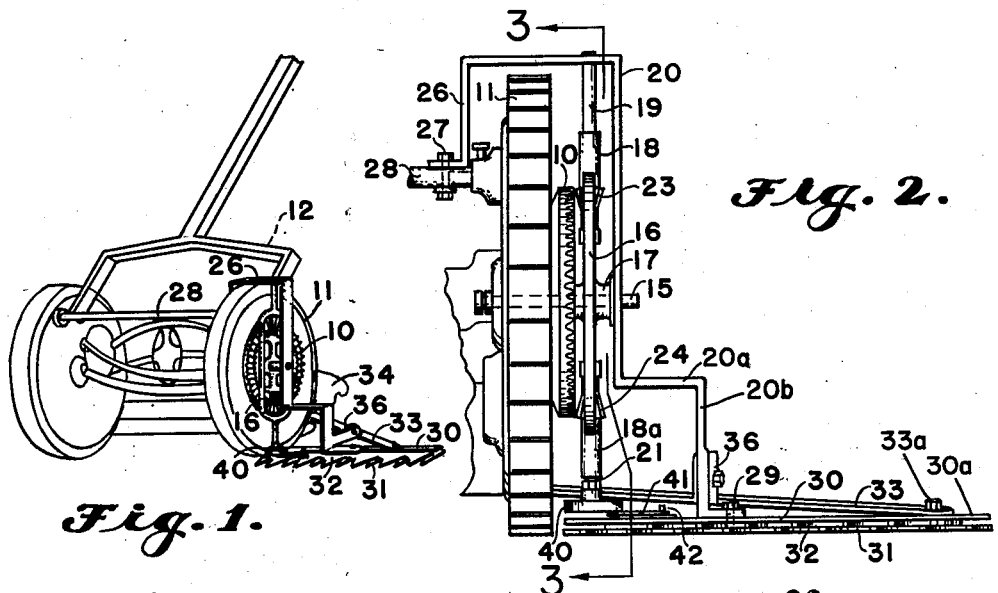
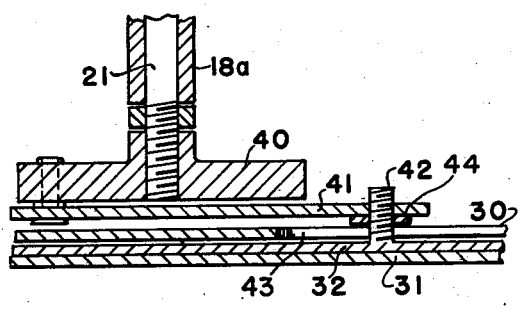
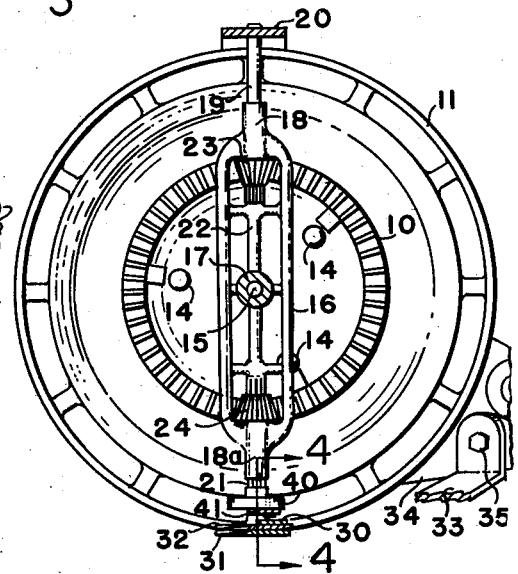
INVENTOR.
Alex Drohomer
BY Stedman B Hoar
Agent Patented June 16, 1953

2,641,893

UNITED STATES PATENT OFFICE 2,641,893

CLIPPER ATTACHMENT FOR LAWN MOWERS

Alex Drohomer, Santa Ana, Calif.

Application August 18, 1951, Serial No. 242,472

5 Claims. (Cl. 56—251)

1

This invention relates to a device adapted to be attached to a lawn mower as an auxiliary grass cutter, and has as an object the provision of a simple clipper attachment of high efficiency.

Numerous attachments for like purposes have appeared from time to time, but so far as I am aware they are not in common use. The principle of operation which is generally employed, and which I propose to employ, is the well-known principle of shearing blades employed in hay cutters, sheep shears, and in some electric razors in which one saw-toothed blade reciprocates longitudinally in shearing engagement with a similar blade. While this principle of shearing is old, and is obviously theoretically applicable to an attachment for a lawn mower, yet it has not been successfully applied, and I attribute the lack of success to failure to provide a suitable driving mechanism for a shearing attachment which is not permanently and rigidly secured to the lawn mower. An attachment of the character envisaged must be readily detachable so as not to conflict with ordinary use of the mower, and it is economical and weight-saving to drive the attachment from the lawn mower rather than by added traction wheels. These requirements require a careful adjustment of the drive linkage between the mower and the attachment each time the latter is re-attached. Furthermore, it is desirable that the attachment extend laterally of the mower so as to reach under hedges and shrubbery; this, in turn, places the attachment under considerable strain which may distort the drive linkage and cause binding or failure to engage.

It is accordingly a further object of this invention to provide a drive linkage for a lateral clipper attachment to a lawn mower which will resist forces tending to cause binding or disengagement of the linkage.

Another object of the invention is to provide a drive linkage for a clipper attachment to a lawn mower which will tend to bring the attachment to a free-running position in the event that the attachment has been maladjusted during installation or has been forced out of adjustment.

Still another object of the invention is to provide a clipper attachment for a lawn mower which may easily be attached to and detached from the mower and which tends to be self-adjusting to a free-running position.

Further objects and useful advantages of my invention will be pointed out as the description of a preferred embodiment of the invention proceeds, or will be apparent from that description

2 considered in conjunction with the accompanying drawing illustrative of that embodiment, in which:

Fig. 1 is a perspective view of my clipper attachment shown attached to a conventional lawn mower.

Fig. 2 is a front elevational view of my attachment, on a larger scale, frame and wheel parts of the mower being shown to illustrate the manner of attaching the device.

Fig. 3 is a vertical sectional view taken on the line 3—3 of Fig. 2; and

Fig. 4 is a further enlarged vertical sectional view on the line 4—4 of Fig. 3.

Having reference now to details of the drawing, my improved clipper attachment comprises a bevel gear 10 mounted coaxially with a traction wheel 11 of a lawn mower 12, and secured to the wheel 11 by bolts 14. The ordinary axle shaft of the wheel 11 is replaced by a stub shaft 15 which extends through the gear 10 and a short distance therebeyond. A yoke 16 has a central hub 17, by which it is mounted on the shaft 15. At the ends of the yoke 16 are bearings 18 and 18a. The bearing 18 holds a shaft 19 which extends through a frame 20, by which the yoke 16 is held in a vertical position upon the shaft 15. The other bearing 18a holds a shaft 21 which extends therefrom downwardly. The inner ends of the shafts 19 and 21 are supported and journalled in a web 22 which inwardly braces the yoke 16. The shaft 19 carries a pinion 23, arranged to mesh with the gear 10, and if so desired mounted to turn freely upon the shaft 19. The shaft 21 carries a pinion 24, also arranged to mesh with the gear 10, but secured to the shaft 21 to cause rotation of the shaft.

The frame 20 has an arm 26 secured by a bolt 27 to an upper tie-rod 28 of the lawn mower 12. Thence the frame 20 extends upwardly over the traction wheel 11, there receiving and supporting the upper end of the shaft 19, and then downwardly on the outer side of the yoke 16, there receiving and supporting the outer end of the shaft 15. Below the shaft 15, the frame 20 extends outwardly and downwardly as shown at 20a and 20b and is secured by a bolt 29 to a carrier plate 30 which supports clipper blades 31 and 32. The carrier plate 30 extends laterally of the lawn mower 12 so that the blades 31 and 32 may clip a swath parallel to the swath cut by the lawn mower. A brace bar 33 is secured as by bolt 33a to the outer end 30a of the carrier plate 30 and extends rearwardly and inwardly toward the side frame 34 of the lawnmower, to which it is attached by a bolt 35 adjacent to the conventional trailing roller of the lawn mower. A rearward arm 36 of the frame 20 is secured to the brace bar 33 so that the frame 20, arm 36, brace bar 33 and carrier plate 30 have a substantially rigid triangular truss formation.

The clipper blades 31 and 32 are supported in the usual manner by the carrier plate 30, the lower blade 31 being held fast by any suitable means such as the bolt 33a to the plate, and the upper blade 32 being held slidably for lengthwise reciprocation between the blade 31 and the plate 30. A pitman 40 is secured to the lower end of the shaft 21 which as hereinbefore stated is supported on the shaft 15 by means of the web 22 of the yoke 16, and a connecting rod 41 connects the pitman to a post 42 on the reciprocable blade 32. The post 42 passes through a slot 43 in the carrier plate 30, and is threaded to support a nut 44, adjustable to hold the connecting rod 41 at a level at which the rod may swing without binding. The post 42, being beyond the orbit of the pitman 40, may be of sufficient height to keep the connecting rod 41 from jumping the top of the post; the pitman will keep the rod from rising on the post. Of course a second nut may be placed on the post 42 above the rod 41, but because of the danger of fouling close bearing surfaces with cut grass, I have found freedom of action to be more desirable than close restraint. It will be obvious that rotation of the traction wheel 11 and gear 10 attached thereto will cause rotation of the pinion 24, shaft 21, and pitman 40, and through the connecting rod 41 will cause the blade 32 to reciprocate lengthwise relatively to the blade 31.

To attach or detach my clipper attachment it is only necessary to manipulate the bolts 27 and 35, holding the frame arm 26 and the brace bar 33 respectively to the lawn mower frame. When these bolts are removed, the attachment may be removed as a unit, with the exception of the gear 10 and the stub shaft 15 which remain on the lawn mower but do not protrude unduly therefrom. To replace the attachment the hub 17 is placed upon the stub shaft 15, the yoke 16 is swung to a vertical position and the bolts 27 and 35 are replaced connectively in the arm 26 and brace bar 33 and tightened to the lawn mower frame.

The usual difficulty of alignment of a clipper attachment so that it drives freely is obviated by the idler pinion 23. If the yoke 16 is not in true position in which the drive pinion 24 meshes freely with the gear 10, the idler pinion 23 will clash with the gear. If in replacing the attachment upon the lawn mower, the bolts 27 and 35 are left temporarily a little loose, and the lawn mower is rolled a few inches to cause operation of the attachment mechanism, the two pinions 23 and 24 will automatically bring the mechanism to a free-driving alignment and the bolts may then be tightened. As there is ordinarily no need of disturbing any other connections in the attachment mechanism, this one simple adjustment suffices. The laterally extending clipper blades receive a great deal of rearward thrust during operation, which can develop considerable leverage upon the brace bar 33 and bolt 35. The thrust may also be upward, tending to cant the frame 20 and to cause disengagement of the pinion 24 from the gear 10. In either event, any change in position of the frame 20 and yoke 16 will be communicated to the idler pinion 23 as well as to the driving pinion 24, and the idler pinion will exert a counter-force or resistance. This resistance is dynamic because the pinion 23 is a moving, not static, member; it will be responsive in proportion to the force which tends to make the pinion 23 bind; but it is exerted gently and restoratively and permits a lightweight attachment bolted only at two points to be as effective and as easily driven as much heavier attachments secured at many points by elaborate frame work.

As modifications may be made in my invention without departure from the spirit thereof, I do not wish to have my invention limited to the precise showing herein given, but to have the invention interpreted as inclusive of all changes and modifications falling within the scope of the appended claims.

I claim:

1. A clipper attachment for lawn mowers comprising: cooperating clipper blades, one of which is reciprocable relatively to the other; a gear on one of the traction wheels of said lawn mower; a yoke; frame means supporting said blades and engaging one end of said yoke for holding said yoke adjacent to said gear; an idler pinion supported by said yoke and meshing with said gear; a second pinion and a shaft therefor supported by said yoke, said pinion meshing with said gear; a pitman on said shaft; and a connecting rod connecting said pitman and said reciprocable blade.

2. A clipper attachment for lawn mowers comprising: a gear on a traction wheel of said lawn mower; a stub shaft extending outwardly from the hub of said wheel; a yoke supported on said stub shaft; a frame member secured to said lawn mower and engaging one end of said yoke and said tub shaft; an idler pinion supported by said one end of said yoke and meshing with said gear; a second pinion supported by the other end of said yoke and meshing with said gear diametrically opposite to said idler pinion; a shaft driven by said second pinion; cooperating clipper blades supported by said frame in lateral extension from said lawn mower; and crank means connecting said driven shaft to one of said blades to cause relative reciprocation of said blades.

3. In a clipper attachment for lawn mowers inclusive of relatively reciprocable clipper blades, a frame supporting said blades, crank means for causing relative reciprocation of said blades, a gear on a traction wheel of said lawn mower, and a pinion driven by said gear and driving said crank means, the improvement comprising: an idler pinion meshing with said gear; a stub shaft extending axially of said wheel; and a yoke held by said stub shaft and said frame and holding said pinions in fixed positions relatively to each other, whereby correct meshing of one of said pinions necessitates correct meshing of the other.

4. A clipper attachment for lawn mowers comprising: cooperating clipper blades; a stub shaft extending axially of a traction wheel of said lawn mower; a frame removably connected to an upper tie-rod of said lawn mower and to a rearward member of said lawn mower and extending above said wheel and then downwardly and outwardly for supporting said blades in lateral extension from said lawn mower; a gear on said lawn mower concentric with said wheel; crank means operatively connected to said gear and to one of said blades for reciprocating said one blade in response to rotation of said gear;

support means for said crank means supported on said stub shaft and connected to said frame; and an idler pinion supported by said support means and meshing with said gear, whereby a change in the position of said frame relatively to said lawn mower acts through said support means to cause a change in the mesh of said idler pinion with said gear.

5. A clipper attachment for lawn mowers comprising: cooperative clipper blades; a frame supporting said blades in lateral extension from said lawn mower; bolts removably securing said frame to said lawn mower at two spaced positions; cooperative gear and crank means on said lawn mower and said blades for causing relative reciprocation of said blades in response to rotation of traction means of said lawn mower; and an idler gear connected to said crank means and normally meshing with said gear means when the alignment of said frame permits free cooperation of said gear means and said crank means.

ALEX DROHOMER.

References Cited in the file of this patent

UNITED STATES PATENTS

| Number | Name | Date |
|---|---|---|
| 431,836 | Bockus | July 8, 1890 |
| 807,934 | Jackson | Dec. 19, 1905 |
| 1,445,515 | Jones et al. | Feb. 13, 1923 |
| 2,044,159 | Durst | June 16, 1936 |